United States Patent [19]

Weller et al.

[11] 4,152,934

[45] May 8, 1979

[54] VECTOR MEASURING CURRENT METER

[75] Inventors: Robert A. Weller, San Diego; Russ E. Davis, La Jolla, both of Calif.

[73] Assignee: The United States of America as represented by the Secretary of the Navy, Washington, D.C.

[21] Appl. No.: 882,500

[22] Filed: Mar. 1, 1978

[51] Int. Cl.$^2$ ............................................. G01W 1/02
[52] U.S. Cl. ..................................................... 73/189
[58] Field of Search ...................... 73/189, 229, 170 A

[56] References Cited

U.S. PATENT DOCUMENTS

| | | | |
|---|---|---|---|
| 3,610,039 | 10/1971 | Althouse et al. ....................... | 73/189 |
| 4,031,755 | 6/1977 | Ravussin ................................. | 73/189 |

*Primary Examiner*—Jerry W. Myracle

*Attorney, Agent, or Firm*—Richard S. Sciascia; Paul N. Critchlow

[57] ABSTRACT

The present meter is characterized by its very accurate cosine response to current vector components of fluid (air or water) velocity parallel to the rotational axes of its propeller-like flow sensors. Structurally, it employs two flow sensors rotatably mounted on a rod or 'sting' carried by a casing. Each sensor includes a pair of back-to-back propellers or fans mounted on a single axial shaft rotatably supported by the rod. The rotational axes of the two flow sensors are normal one to the other and also normal to the axis of the rod. Rotation of the fans activates a switch-like arrangement electrically coupled to an up-down counter carried in the casing. Blade rotation in one direction yields an 'up' count and vice versa.

8 Claims, 14 Drawing Figures

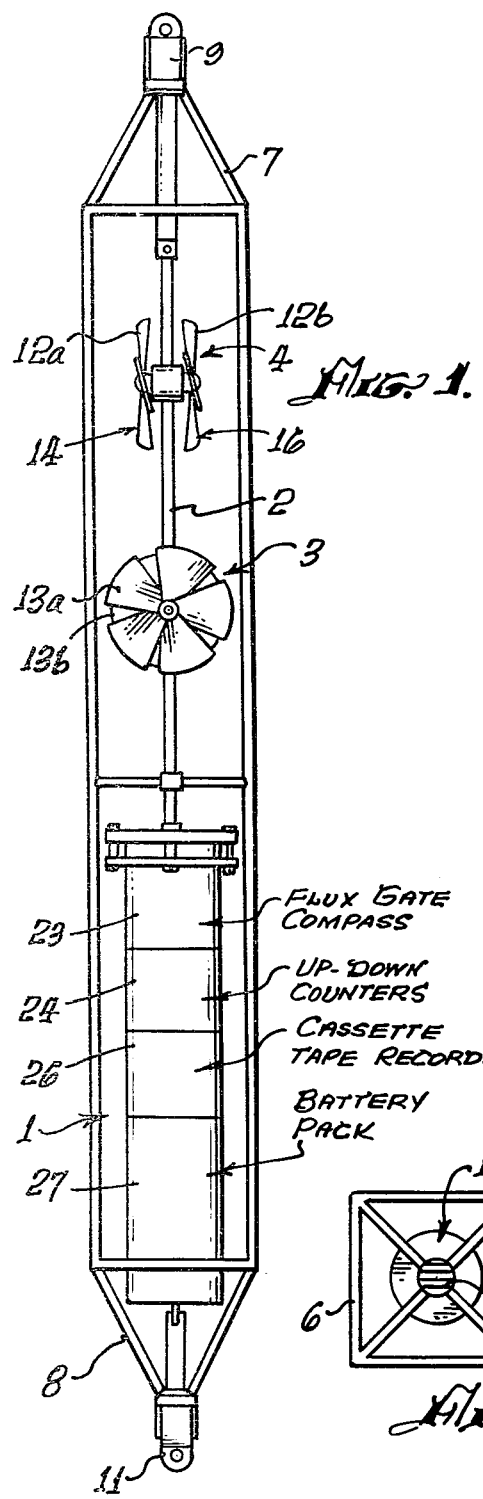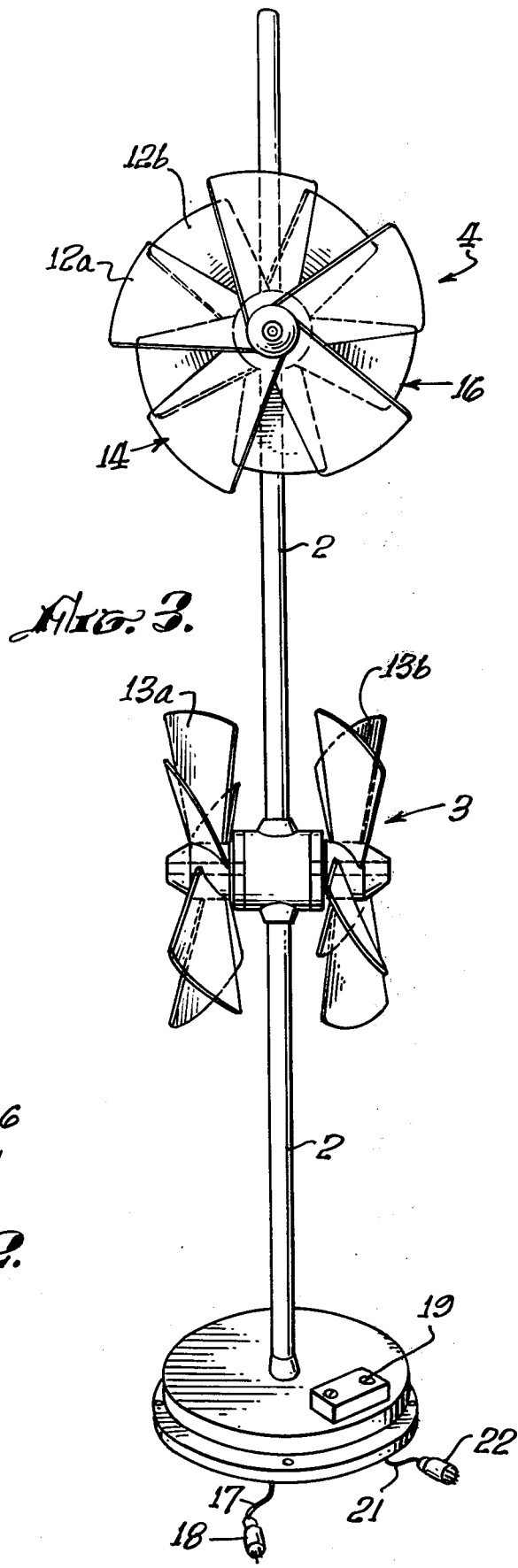

RESPONSE OF A SINGLE PROPELLOR

SENSOR RESPONSE (OPEN CIRCLES 30°, DOTS 45°)
COSINE (SOLID LINE)

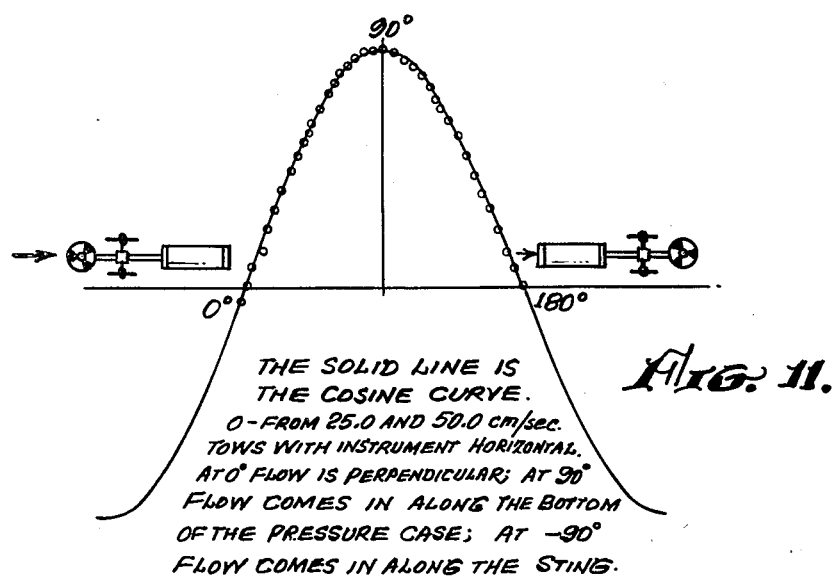

THE SOLID LINE IS
THE COSINE CURVE.
O-FROM 25.0 AND 50.0 cm/sec.
TOWS WITH INSTRUMENT HORIZONTAL.
AT 0° FLOW IS PERPENDICULAR; AT 90°
FLOW COMES IN ALONG THE BOTTOM
OF THE PRESSURE CASE; AT -90°
FLOW COMES IN ALONG THE STING.

FIG. 11.

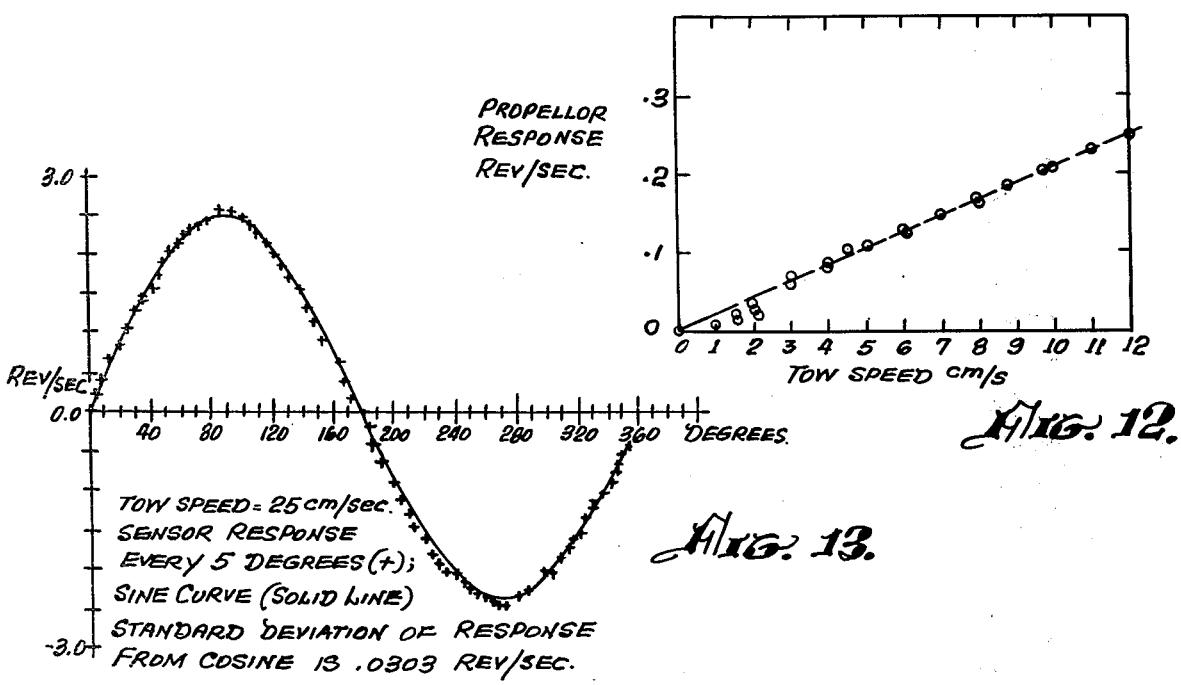

TOW SPEED = 25 cm/sec.
SENSOR RESPONSE
EVERY 5 DEGREES (+);
SINE CURVE (SOLID LINE)
STANDARD DEVIATION OF RESPONSE
FROM COSINE IS .0303 REV/SEC.

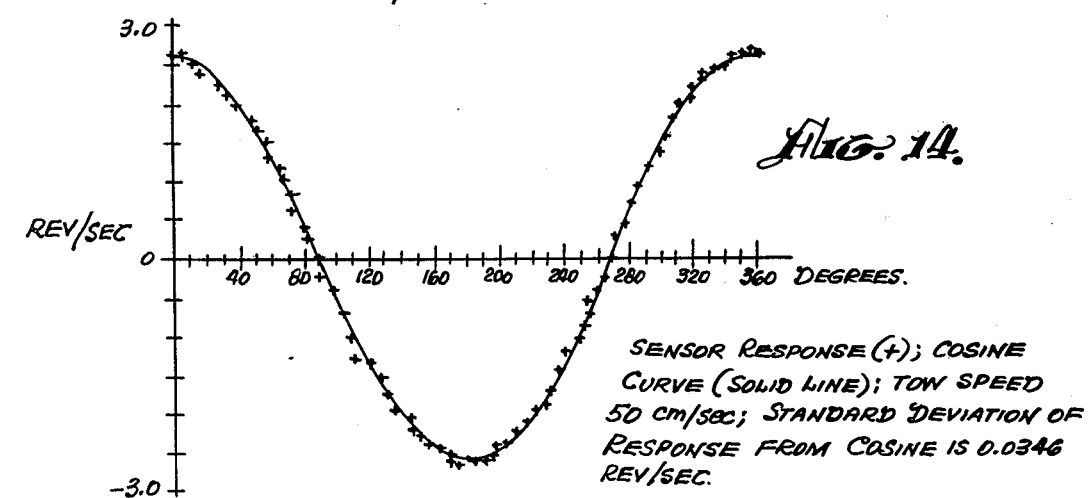

FIG. 14.

SENSOR RESPONSE (+); COSINE
CURVE (SOLID LINE); TOW SPEED
50 cm/sec; STANDARD DEVIATION OF
RESPONSE FROM COSINE IS 0.0346
REV/SEC.

VECTOR MEASURING CURRENT METER

BACKGROUND OF THE INVENTION

The invention relates to air or water current meters and, in particular, to vector measuring meters of a mechanical type employing fan-like flow sensors.

The present meter primarily has been developed for use in the upper ocean to operate in the presence of high frequency horizontal and vertical velocity fluctuations associated with surface waves and mooring motions without introducing errors into the measurements. However, operation in other water environments or in air also are contemplated.

Most current meters use electromagnetic, acoustic or mechanical sensors. Electromagentic types generate a local magnetic field and sense the electric field induced by the passage of a conductive fluid, such as sea water, through the magnetic field. Their sensors may be designed to measure orthogonal components of flow or they may have one sensor to measure speed and a vane or fin to align the instrument with the direction of flow. Acoustic sensors are of different types one of which measures Doppler shift of back-scattered sound while another measures the difference in travel time of acoustic signals sent in opposite directions along the same path. Usually the acoustic sensors are mounted in pairs at right angles to measure orthogonal components. Mechanical current meters use an S-shaped rotor or propeller as a speed sensor plus a vane as a direction sensor. Some of these instruments are comparable to the present meter in that they mount their propellers at right angles to measure orthogonal components.

The various types of meters also employ various sensing techniques which, generally, can be divided into two distinct groups one of which senses speed and direction with horizontal velocity being measured in polar coordinates. The other senses components of velocity in Cartesian coordinates, using flow sensors mounted at right angles. In both groups an internal compass establishes the orientation of the instrument with respect to magnetic north. However, regardless of the nature of the sensing technique, most meters are designed to remain in the ocean for relatively long periods of time. Consequently, for practical reasons, they use a periodic sampling procedure other than a continuous one. Such sampling itself can introduce measurement errors that are seriously compounded if the sensor response is not accurate or, in other words, not a true cosine response.

In undertaking the present development, all known types of current meters were investigated and, for a variety of reasons, the goal became one of developing a mechanical type of meter using fan-like sensors or propellers having a true cosine response. Electromagnetic sensors were not considered appropriate since they have a tendency to over respond in unsteady flow conditions. Additionally, their performance depends rather critically on the boundary layer flow around the sensor. Acoustic sensors, in turn, require sophisticated electronics and their design is considerably more complex and expensive.

As to the prior art mechanical propellers, there are some which have been designed for and used in the upper ocean. In general, however, no prior art propeller sensor or sensor arrangement has been found which is capable of providing the requisite cosine response accuracy particularly under the contemplated upper ocean environment for which the present arrangement primarily is intended.

The principal object of the invention, as should be apparent from the foregoing description is, generally, to provide an accurate cosine response of a propeller-type flow sensor. A further object is to provide the true cosine response in a meter having a pair of flow sensors mounted at right angles to measure orthogonal components. These objects are achieved primarily by employing two sensors set at right angles with each sensor formed of back-to-back true cosine propellers.

BRIEF DESCRIPTION OF THE DRAWINGS

The invention is illustrated in the accompanying drawings of which:

FIG. 1 is a side view of the current meter disposed in its intended operating position;

FIG. 2 is a bottom view of the FIG. 1 meter;

FIG. 3 is an enlarged view of the sensors and their rod-like supporting member;

FIGS. 5–14 provide various plots of cosine responses for different propeller designs and arrangements used in experimentally developing the present meter.

DETAILED DESCRIPTION

Figure 4:
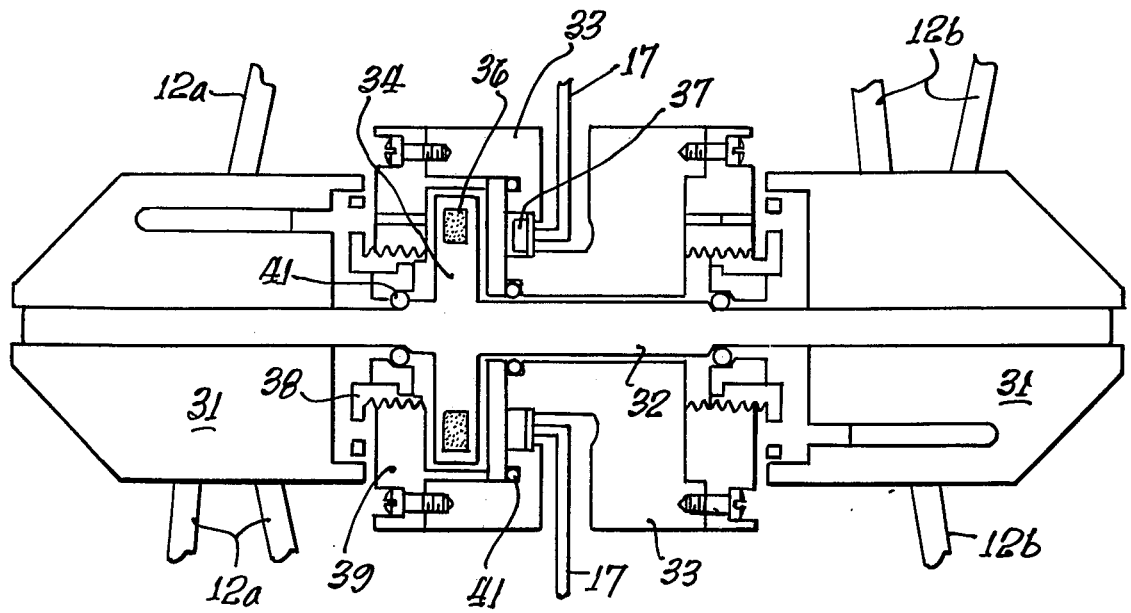
FIG. 4 is a schematic view through one of the hub portions.

As shown in FIGS. 1–3, the structure of the present current meter includes a pressure casing 1 on which is mounted a vertical support rod or 'sting' 2 which carries a pair of current flow sensors 3 and 4. A protective cage structure 6 rigidly supports the rod and pressure casing and, as shown, it includes at each of its end portions bail sections 7 and 8 carrying cleats 9 and 11. Normally, the meter is employed in its illustrated vertical disposition with, for example, a winch cable coupled to cleat 9 and another anchor-bearing cable coupled to cleat 11. Obviously, other suspensions can be employed. For example, in a recent development, an automatic profiling winch is used. In operation, the winch has a controller that can be programmed to stop at eight depths during descent and another eight during ascent. The depth and time spent at each stop also can be set as desired. This automatic profiling is particularly useful in profiling the velocity in the upper ocean environment.

Cage 6 preferably is formed with four stainless steel rods of about ½ or ⅜ inch diameter. In earlier deployments, thinner rods of about ¼" were found to have insufficient rigidity so that, in one operation, both the sensors and the rod or sting became bent and twisted. The pressure case and the sensor are fixed inside the cage so that they cannot rotate but at the same time are not under any tension from the mooring. The casing as well as the rod preferably are formed of aluminum with sacrificial zinc anodes protecting the rod from galvanic corrosion.

A principal feature of the invention is the fact that each flow sensor 3 and 4 is formed of a pair of twin propellers or fans 12a, 12b and 13a and 13b. These twin or identical fans are rotatably mounted on sting 2. In particular, when the meter is operatively disposed in its vertically-suspended disposition, the fans are mounted to rotate about their horizontal axes with the axis of one pair being disposed at right angles to that of the other pair so as to measure orthogonal components of flow in the horizontal direction. Both rotational axes also are normal to the longitudinal axis to sting 2. Thus, the arrangement is one adapted to rotationally respond to current vector components of fluid velocity parallel to the horizontal axes of rotation. Further, the mounting of each pair of fans is such that they rotate in one direction for current flow arriving from one side of the fans and in the opposite direction for current flow from the other side. To illustrate, fans 12a, 12b both will rotate in a clockwise direction responsively to current flowing in the direction of arrow 14 (or any of its vector components). Current flow in the opposite direction, as designated by arrow 16, produces a counter-clockwise rotation.

In a manner to be described, the rotational responses of the fans are applied through conductors 17 and a plug 18 to an electronics package protectively mounted in casing 1. A pressure gage 19 also is mounted on the top cap of pressure casing 1 and its output is coupled to the package through a conductor 21 and plug 22. In one embodiment the electronic package includes a flux gage compass 23, printed circuit cards providing up-down counters 24, a Memodyne cassette tape recorder 26 and a battery pack 27. The fan revolutions are counted by the up-down counters which add one count for each particular rotational displacement caused by a positive flow such as is designated by arrow 14 (FIG. 1). Conversely, one count is subtracted for each identical displacement produced by negative flow as represented by arrow 16. At the end of each sampling interval the length of which can be set by jumpers in the electronics, the count of the up-down counters, as well as the instantaneous heading of the instrument provided by compass 23, are written on the cassette tape along with the data from pressure gage 19. The data on the tapes then can be transferred to a 9-track magnetic tape and processed by a laboratory computer. Alternatively, the computer itself can be included as part of the electronics package carried by the casing. This type of electronics package has been successfully implemented. It is not illustrated since the present invention is concerned primarily with attaining an accurate cosine response for the vector components rather than with the processing of the attained data. It will be noted that FIG. 1 also includes dimensional information. Obviously, these dimensions can be varied to suit different applications although certain spacings improve performance in manners which will be discussed.

FIG. 4 shows the manner in which the twin propellers are mounted on rod 2. It also shows the manner in which the rotational signal input for the up-down counters are derived and applied to the counters. As to the mounting, each of the propellers is formed integrally with the usual hub portion 31. A single axle-like shaft 32 supports both propellers in their back-to-back disposition and, as shown, the rod itself is supported for rotation within a cylindrical axle housing 33. Propeller rotation obviously rotates shaft 32 as well as a plastic disc 34 on which are mounted four circumferentially-spaced magnets 36. Housing 33, in turn, fixidly mounts a small circular printed circuit card formed with two magneto diodes 37 which, as shown, are included in previously-identified electric circuit 17. The circuit is energized when a rotating magnet passes over one of the magneto diodes. In this manner electrical pulses representative of propeller rotation are relayed to the counters. As already noted, the count is up or down (addition or subtraction) depending upon the direction of the propeller rotation. Direction, in turn, can be sensed by the phase difference of the pulses. In this regard, the magneto diodes are spaced one from the other to provide a greater distance in one circumferential direction (between the diodes) than in the other. A phase shift then occurs when the rotation of the propellers is reversed and, as stated, this information is used to produce either an 'up' or a 'down' count. It also is apparent that each pulse is produced by a certain rotational displacement of the propellers so that each count represents a certain amount of their rotational displacement. The circuit coupling the diodes to the counters is led axially through hollow rod 2 into pressure casing 1 where it is coupled by plug 18. Comparable switch-like arrangements, other than the illustrated magneto diodes, can, of course, be substituted. For example, a photo diode arrangement energized through slits in a rotating plate achieves a similar result and, in fact, has been successfully used in prototypes.

To minimize rotational friction the propeller mounting includes conventional ball-bearing supports. Thus, with reference to FIG. 4, the arrangement includes bearing holders 38, end caps 39, and ball bearings 41 contained in bearing races and retainers.

In the development of the true cosine propeller an experimental rather than analytical approach was used. Specifically, a variety of different propellers were constructed and exhaustively tested in a wind tunnel to determine the effect of variations in such parameters as blade pitch, size, shape, spacing, etc. Subsequently, using the information provided by these tests prototypes were constructed and a comprehensive series of water tow tests were conducted to define quantitatively the responses to various flow conditions. In fact, current meter responses in both steady and unsteady conditions were established by results obtained in some 2000 tests. Finally, field tests were conducted on the prototypes.

A brief description of the history of the present development should serve to define the significant parameters. First, with regard to the tests themselves, the various propellers were mounted on a wind tunnel test stand. Flow speed in the tunnel was set and maintained at a constant value by monitoring with a Pitot tube upstream of the test site. The particular propeller under test was never larger than 22 cm from blade tip to blade tip and it was centered in the 76 cm wide, 76 cm tall tunnel to avoid wall effects. The stand was pivoted and stopped at 5° increments in angle of the attack to determine revolution rate versus angle of the attack. The same procedure was carried out for each of the various propellers at several wind speeds. To count propeller revolutions, magnets simply were mounted on the tips of the blades. These magnets passed over a reed switch in the test stand and the resulting signal was filtered to remove contact bounce and counted.

Figure 5:
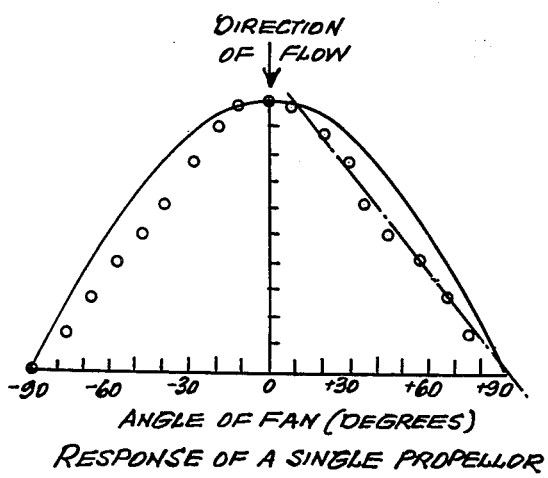
Figure 6:
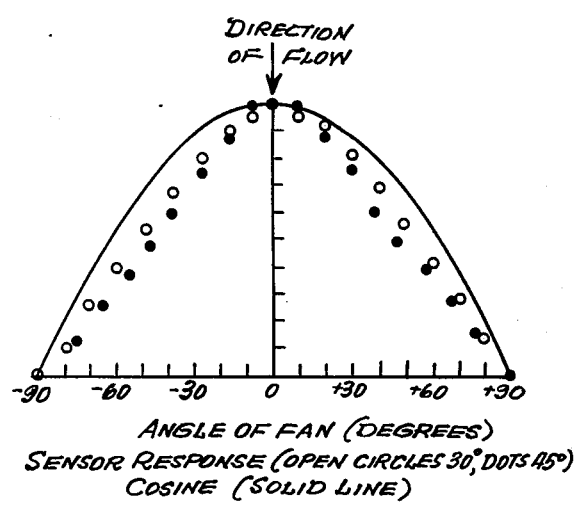
Figure 7:
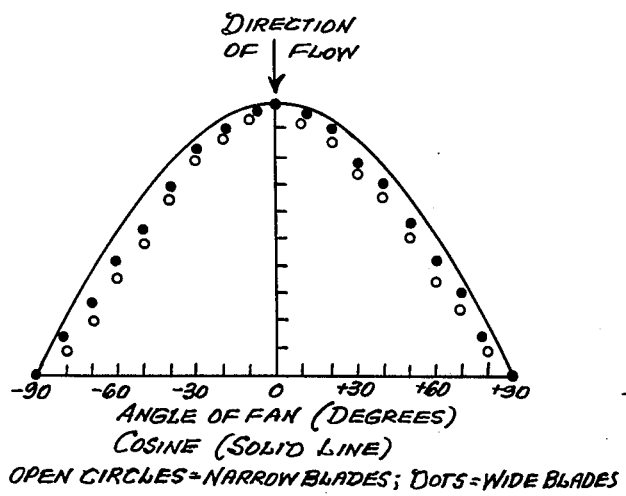

The main insights provided by the results of the wind tunnel tests can be summarized as follows:

(1) Any single propeller, as opposed to the present back-to-back propellers, has a response closer to sawtooth than to cosine as shown in FIG. 5;

(2) A propeller with blades at 30° pitch shows a response closer to cosine than a propeller with a 45° pitch. FIG. 6 shows a comparison of two propellers of identical construction except for their pitch;

(3) Increasing the number of blades per propeller makes the response closer to cosine within limits. (In particular, a comparison of the responses of 4, 5 and 6 bladed propellers shows that the 4-bladed propellers tend to undershoot the cosine while the 6-bladed propellers tend to overshoot.) A 5-bladed propeller provided the best performance;

(4) Changing the shape of the blades to increase their surface area while maintaining the same length provides a better cosine response as shown in FIG. 7, and (5) Two propellers mounted on one shaft had a response closer to cosine than a single propeller on the same shaft.

Figure 8:
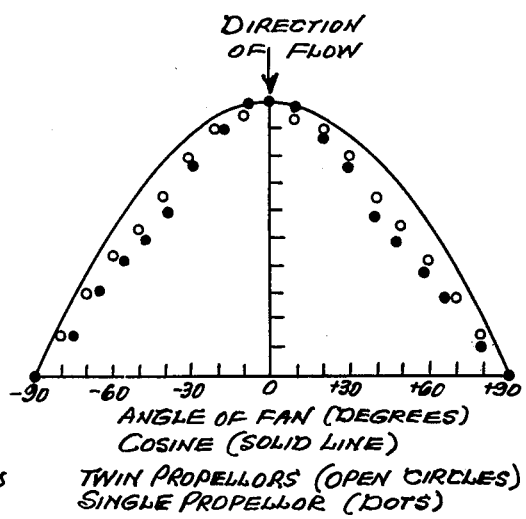
Figure 9:
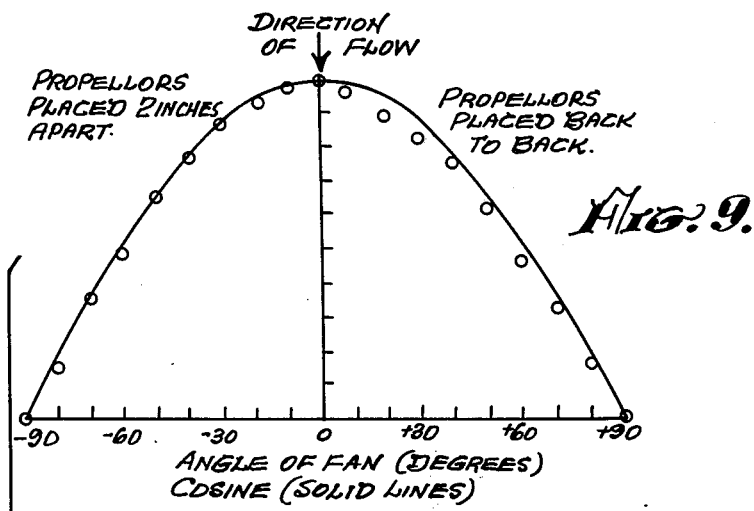

FIG. 8 shows a comparison of single and double propeller responses. It also has been shown that the exact response of the double propeller sensor can be altered by changing the spacing between the propellers and their orientation with respect to one another. FIG. 9 illustrates these facts. The lower curve of FIG. 9 perhaps should be clarified. On the left side, as indicated in the drawing, the propellers are disposed directly in line while, on the right side, the propellers are rotated to minimize overlap. The rotation is what has been referred to previously as the staggered disposition of the fans. In other words, looking directly at the face of one pair of fans, the rearward fan is staggered relative to the forward one sufficiently so that the blades of the rearward fan fill the spaces between the blade tips of the forward one. All of the test run data shown in FIGS. 5-9 clearly is significant and, as demonstrated in these runs as well as many others, it all should be applied if optimum cosine response is to be achieved. However, it also has become apparent that essential improvement coming out of the tests resides in the use of the back-to-back or twin propellers. Thus, although it may be possible to design a single propeller or fan arrangement having a true cosine response, the twin fan arrangement seems to be the single most important factor in the success which has been achieved. Further, the twin fan arrangement is of particular importance in meters, such as the present one, which measure current flow in opposite directions, i.e. bi-directional flow of arrows X and Y of FIG. 1. When such is the case, the twin fans appear to be essential. In particular, they provide an inherent symetry not present in a single fan arrangement. In other words, the symetry presented to oppositely directed flows is identical. Flow disturbances such as are produced by the bearing supports of single fans are relatively inconsequential in the symetrical twin-fan arrangements. Another significant advantage of the twin fans is indicated by the FIG. 7 plot which shows that cosine response is improved by changing the shape of the blades to increase their surface area. The twin fan arrangement provides increased surface area particularly when the fans are relatively staggered so that one fan fills the space between the blade tips of the other.

A second set of wind tunnel tests was conducted with the specific goal of adjusting the propeller design until the response became truly cosine. The basic design used two propellers separated by a cylinder with bearings and rotation sensors being mounted in the cylinder in a manner comparable to that shown in FIG. 4. This arrangement eliminated the need for the magnets on the propeller tips. The cylinder, of course, is comparable to the hubs and axle-housing 33 of the present current meter. The propeller passed through the hub and was held by precision stainless ball bearings. Inside the hub, a light emitting diode (LED) illuminated a photodiode. The light path was interrupted by a slotted disc attached to the propeller shaft and the resulting pulsed output of the photodiode was counted to determine the propeller revolution rate.

Figure 10:
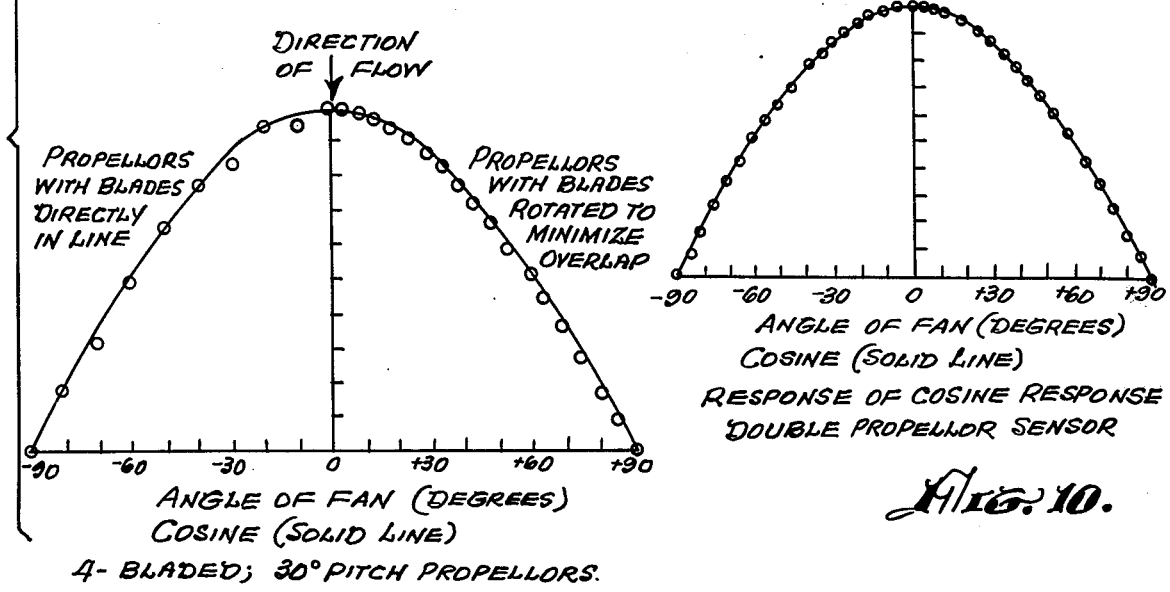

Initial tests with this arrangement indicated that two 5-bladed propellers of 30° pitch had a response quite close to cosine. For final tuning, pairs of 5-bladed propellers were made from polycarbonate plastic with blade pitches of 25.0°, 27.5°, 30.0°, 32.5° and 35.0°. Pairs of four and six bladed propellers of 30° were also constructed. These pairs were tested with various spacings and various orientations on the shaft. The most successful configuration was a pair of 5-bladed propellers with 30° pitch mounted on the shaft offset from one another (i.e. staggered one to the other) with a spacing of 0.46 cm between the back of each propeller and the axle housing. The response of this pair of 5-bladed propellers is shown in FIG. 10 in which the accurate cosine response will be apparent.

As a next step in the development, the tuned sensor arrangement was mounted on a tow cart of a wind wave channel located at the Hydraulics Laboratory, Scripps Institution of Oceanography. The angular response of the double propeller sensor was confirmed to be cosine for speed between 2 and 100 cm/sec. Testing then concentrated on determining how to combine two sensors mounted at right angles into one unit capable of sensing the horizontal components of velocity and how to mount this unit on a pressure case such as would house the electronics package. A full size model of a pressure case was made and one sensor was attached with the distance between the pressure case and sensor being adjustable. Tow tests were run to determine the angular response of the sensor when mounted at various distances from the pressure case. It was found that the distance could be decreased to 30 cm without degrading the cosine response. A second propeller sensor then was attached to the tube in a manner which again permitted adjustments in the spacing of the two sensors. Mounted at right angles to the first sensor and 36 cm away, the second sensor did not affect the angular response of the first.

Tow test then were conducted to verify cosine response to flow in the horizontal plane with the instrument being mounted vertically and the sensor and case extending into the water of the tank. Next, the instrument was mounted horizontally under water so that the response of the sensors to flow out of the horizontal plane could be measured. With this mounting, the instrument was swung through 180° with the flow parallel to the case at 0° and 180°. Flow disturbance was anticipated when a sensor was located downstream from the pressure case or from the other sensor. With spacings of 30 cm between the pressure case and the first sensor and 36 cm between the two sensors, the response shown in FIG. 11 was obtained. As will be seen, deviation from cosine was very little.

A prototype incorporating these spacings and constructed of materials capable of withstanding ocean environment then was built and tested to quantitatively define its response to various flow conditions. As to actual construction, this prototype was formed with a pressure casing of aluminum tubing about 6" O.D. and 5" I.D. Aluminum discs capped the top and bottom and the rod or sting was made of 316 stainless steel. A protective enclosure of ⅛th inch 316 stainless steel rod was built around the sensors in a manner similar to the cage structure shown in FIG. 1. Each propeller sensor had a pair of photo-optical devices whose light paths were chopped by a disc on the propeller shaft. The phase shift between the pulsed outputs from the devices indicated the direction of propeller revolution, and the pulse rate indicated the rate of propeller revolution. The propellers were fabricated from Lexan polycarbonate plastic with blades about ⅛th inch thick. The mass of a single propeller was 163.7 g.

In steady flow conditions, the data shown in FIGS. 12, 13 and 14 was obtained. FIG. 12 shows the linear response to be proportional to tow speed. In particular, FIG. 12 shows in detail the response at low speeds and it will be seen that the threshold is below 1 cm/sec with the response becoming linear above 2 cm/sec. The linearity is maintained through increases in tow speed up to 100 cm/sec. FIGS. 13 and 14 show typical response data to flow in the horizontal plane. As indicated, the standard deviation of response from cosine is quite low and in the neighborhood of 0.03 revolutions/sec.

Field tests also have been conducted using the current meters previously described and used in the tow testing. In general, the data obtained from the field tests clearly indicates that the instrument is capable of collecting data in the upper ocean with a significantly improved reliability and with less error than any existing current meter that presently is known. In the field tests, the instruments were lowered from a ship with a 250 kg weight carried 1 m below the pressure case and they were towed through the water at various speed up to 3 knots to simulate deployment in high velocity flow. As already noted, the lighter ⅛th rod in the cage around the sensors were bent as was the sting or rod itself. Subsequently, these members were replaced by stronger structures.

A series of tow tests in the laboratory also were run to determine the results obtained when the flow being sensed is unsteady. In these tests, the current meter was mounted so that it could be swung back and forth through an arc of variable length and variable periodicity. These tests were conducted primarily to ascertain what results could be obtained under the absolute worst case conditions which occur at best infrequently in upper ocean environments. For example, the oscillations used were very much shorter than the normal surface wave periods in the upper ocean. As to the results, it is clear that the relatively rapid oscillations are not measured with absolute accuracy. However, it also appears that, even under these worst condition situations, the present meter performs better than other comparable prior art meters.

It is believed that the intended structure and operation of the present meter should be clear from the foregoing description. The principle improvement is the twin-bladed arrangement which is capable of producing the desired cosine response.

Obviously many modifications and variations of the present invention are possible in the light of the above teachings. It is therefore to be understood that within the scope of the appended claims the invention may be practiced otherwise than as specifically described.

We claim:

1. A vector-measuring current meter comprising:
   a rod-like support member,
   a pair of flow sensors mounted in a spaced relationship on said rod-like member,
   each of said flow sensors including:
      a pair of identical freely-rotatable fan members disposed back-to-back on a single rotational axis with said axes being disposed normal one to the other and also normal to the axis of said rod-like member,
      each identical fan member of each pair of sensors being mounted for clockwise rotation responsive to current flow arriving from one direction and for counter-clockwise rotation for flow from the opposite direction with said rotational response being cosinusoidal relative to current vector components of fluid velocity parallel to the rotational axis of each fan member, and
   means for detecting said rotational responses whereby the responses of both sensors can be combined to provide current speed and direction data.

2. The current meter of claim 1 wherein each of said fan members is provided by a plurality of radially extending identical blades having circumferentially spaced outer edge portions with the blades of each pair of fan members being disposed in a relatively staggered disposition in which the blades of one member essentially fill the spaces between said blade tip portions of the other.

3. The current meter of claim 2 wherein said back-to-back relationship is spaced at a fixed distance to optimize said cosinusoidal responses.

4. The current meter of claim 3 wherein each fan member is a five-bladed member in which the blades have about a 30° pitch.

5. The current meter of claim 1 wherein each of said back-to-back fan members is mounted on a single shaft and said rod member carries a pair of housings each rotatably receiving one of said shafts,
   said meter further including:
      switch means carried by each of said housings,
      an electronics package casing,
      an electric circuit coupling said switch means into said electronic package casing, and
   means carried by each shaft for energizing said switch means whereby rotational movements of said shafts are electrically transmitted to said casing.

6. The current meter of claim 5 wherein said casing includes:
   a compass having an electrical output, and
   means for recording the rotational movement of said propeller shafts and the output of said compass; the compass establishing the orientation of said meter for permitting said rotational movements to be related to the meter orientations.

7. The current meter of claim 6 wherein said switch means is provided by at least two magneto diodes and said switch-energizing is provided by a plurality of magnets,
   said circuit being pulsed by the rotational movement of each magnet over one of the magneto diodes with said magneto diodes being irregularly spaced in a circumferential direction for achieving a detectable phase reversal responsively to oppositely-directed current vectors.

8. The current meter of claim 7 wherein said casing includes an 'up-down' counter means, said switch-energized circuit pulses producing an 'up' count for shaft rotations in one direction and a 'down' count responsively to said phase reversal.

* * * * *